Sept. 20, 1955     J. H. BORNZIN     2,718,189
HYDRAULIC CONTROL FOR BALE CHAMBER DISCHARGE OPENING
Filed Jan. 5, 1953     2 Sheets-Sheet 1
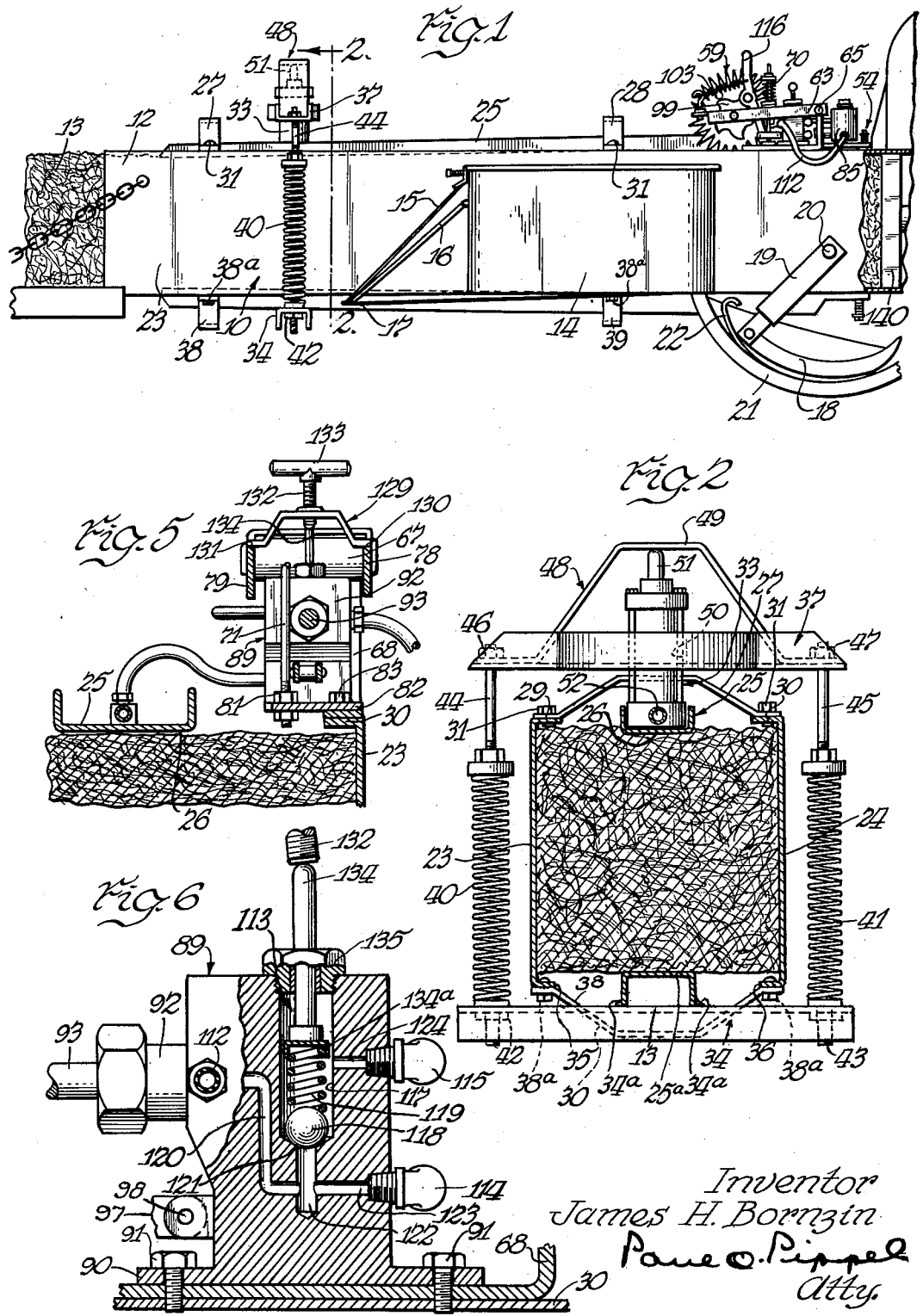

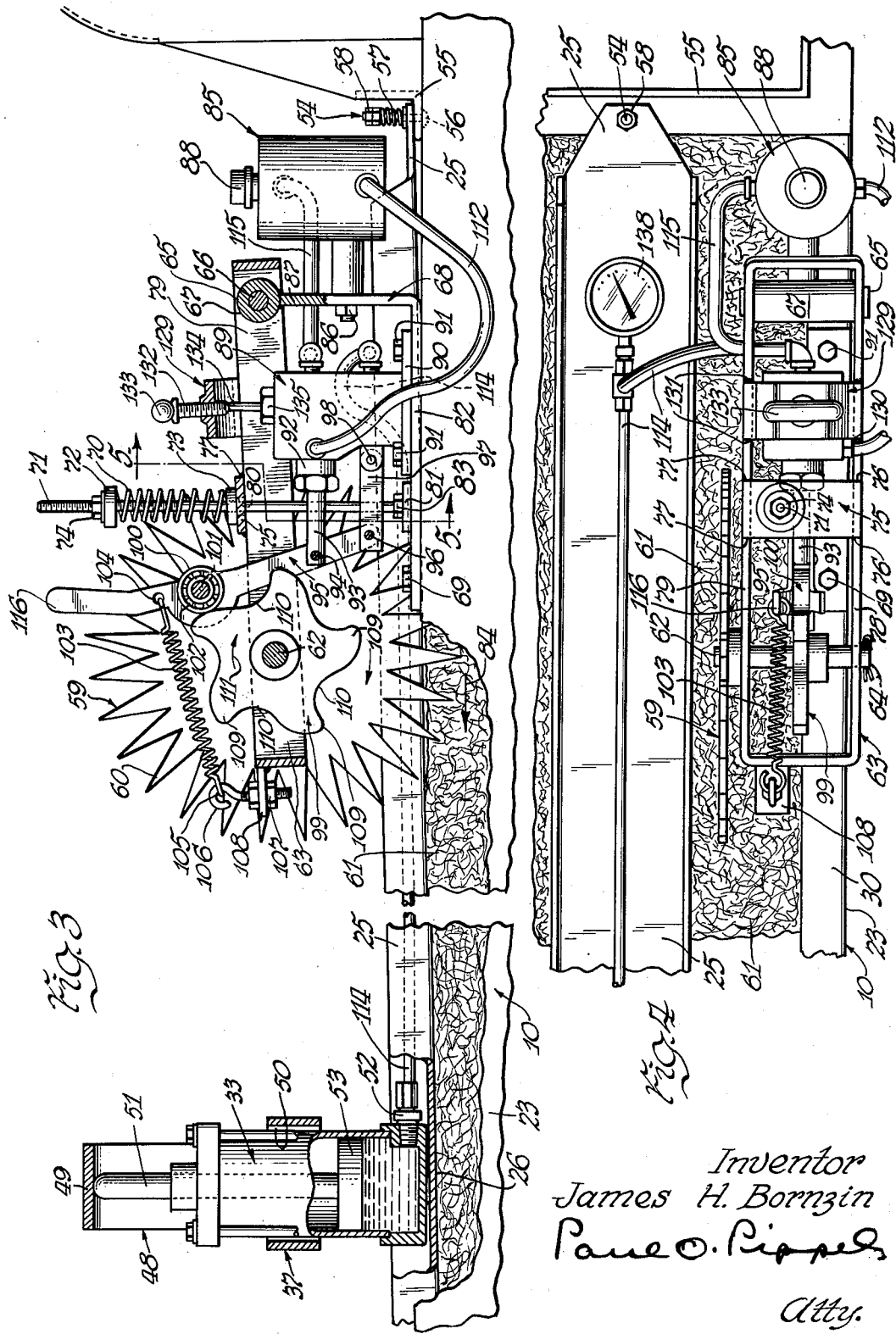

# United States Patent Office 2,718,189
Patented Sept. 20, 1955

2,718,189

HYDRAULIC CONTROL FOR BALE CHAMBER DISCHARGE OPENING

James H. Bornzin, Memphis, Tenn., assignor to International Harvester Company, a corporation of New Jersey Application January 5, 1953, Serial No. 329,555

11 Claims. (Cl. 100—43)

This invention relates to a new and improved hydraulic control for bale chamber discharge opening.

The control of the size of the discharge opening of a bale forming chamber is important in determining the density of the bales being made. This is particularly true of field traversing hay balers wherein the bale in process of being made is pushed or compacted against the bales previously made and still within the bale forming chamber. These completed bales still within the chamber thus form a back pressure by reason of their resistance to discharge which resistance is determined by the size of the bale chamber discharge opening. Anyone baling hay is desirous of obtaining bales of uniform density so that the bales weigh substantially the same amount. Various conditions of the hay being baled require various sizes of discharge openings in order to accomplish bales of uniform density, thus if the hay is damp when baling is commenced there will be a greater friction between the hay and the bale chamber walls than when the hay is dry, which very often occurs if the sun is permitted to dry the hay for a longer period of time. It is thus apparent that the bale chamber discharge opening must have its size constantly varied in order to produce bales of uniform density.

This invention is directed to an automatic control for the discharge opening of a bale forming chamber and is an improvement over the patent to Raney 2,478,012.

A principal object of this invention is to provide hydraulic means for varying the size of a bale chamber discharge opening.

An important object of this invention is the provision of means engaging the hay in a bale forming chamber to thus vary the delivery of hydraulic fluid to a means directly controlling the variable discharge opening of the bale forming chamber.

Another important object of this invention is to supply the power for the hydraulic means from the movement of hay in the bale forming chamber.

Still another important object of this invention is to provide a combination of bale material, density feeler and hydraulic actuator.

Another and still further important object of this invention is the provision of a hay engaging star wheel, the depth of penetration of which directly varies the bale chamber discharge opening and simultaneously the rotation of this same star wheel actuates a hydraulic pump to effect a contracting of the bale chamber discharge opening and/or the fluid under pressure may be bypassed to a reservoir depending upon this same depth of penetration of the star wheel.

Still another important object of this invention is to supply a valve means in a hydraulic system for automatically controlling the size of the discharge opening of a bale forming chamber wherein fluid under pressure may be employed to contract the bale chamber discharge opening, or fluid may be bypassed or partially bypassed in order to vary the degree of contraction and/or the fluid under pressure delivered to the contracting means may be exhausted so that the discharge opening may expand, all dependent upon the density of the hay within the bale forming chamber.

Other and further important objects and advantages of this invention will become apparent from the disclosures in the following specification and accompanying drawings.

In the drawings:

Figure 1 is a side elevational view of the rear portion of a hay baler;

Figure 2 is a sectional view taken on the line 2—2 of Figure 1;

Figure 3 is an enlarged fragmentary side elevational view of a portion of the baler as shown in Figure 1 and having parts thereof in section;

Figure 4 is a top plan view of a portion of the device as shown in Figure 3;

Figure 5 is a sectional view taken on the line 5—5 of Figure 3; and

Figure 6 is a vertical sectional view of the valve means employed in the device of this invention as shown in the drawings.

As shown in the drawings, the reference number 10 indicates generally an elongated bale forming chamber. The forward portion of the chamber 10 has been broken away inasmuch as it forms no part of the present invention. The rearward discharge end of the bale forming chamber 10 is designated by the numeral 12 and it is the size of this discharge opening 12 with which the present invention is concerned. A completed bale of hay 13 is shown emerging from the discharge end 12 of the bale forming chamber 10. Hay, straw or other material to be baled is delivered to the bale forming chamber 10 at or near the forward end (not shown), and by some compressing means such as a reciprocating plunger 140 the material is compacted and tied into a bale or bundle whereafter the bale is discharged through the elongated chamber 10. As shown in Figure 1, a twine or strand material is provided within a container 14 mounted on the side of the bale forming chamber 10 and the twine is discharged from the container 14 as shown at 15 and 16 and thereupon extends downwardly and rearwardly over a spring tensioning member 17, and thence forwardly to a bale encircling needle means as shown at 18. The needle 18 is adapted to swing upwardly through the chamber 10 and there engage a knotting mechanism where the strand encircling ends are united in a suitable knot or twist. The needle 18 is carried on an arm 19 pivoted at 20 on the bale forming chamber 10. The needle 18 is shielded by means of an arcuate guard 21 depending beneath the bale forming chamber 10. A brake member 22 is formed on the guard member 21 and retards and stops movement of the needle 18 in its retracted position. All of this bale tying mechanism is not pertinent to the invention to be described herein but it does show the environment for the invention and provides the logical reasoning for the means to contract or expand the discharge opening 12 of the chamber 10.

As best shown in Figure 2 the bale forming chamber 10 includes spaced apart side walls 23 and 24 in the form of inwardly turned channel members. The bale of hay 13 is shown being extruded through these parallel channels 23 and 24. The resistance to the passage of this completed bale of hay 13 through this discharge portion 12 of the bale forming chamber 10 creates the back pressure necessary to the formation of succeeding bales of substantial density. There is no means of forming a compact dense hay bale unless there has previously been formed a bale of hay and that bale not yet removed from the bale forming chamber. A U-shaped channel member 25 is adapted to have its lower flat surface 26 engage the top of the hay adjacent the discharge opening 12 of the bale forming chamber 10. The channel member 25 is disposed substantially centrally between the spaced apart parallel side walls 23 and 24 of the chamber 10, and by means of varying the vertical positioning of this channel member 25 the effective size of the discharge opening 12 may be varied to accomplish the uniformly dense bales. As shown in Figure 1, the channel member 25 is loosely guided beneath longitudinally spaced apart bracket members 27 and 28 which span the laterally spaced apart chamber walls 23 and 24. These bracket members 27 and 28 are fastened to the inwardly turned top flanges 29 and 30 of the chamber walls 23 and 24 by means of bolts or the like 31. A hydraulic cylinder 33 is arranged and constructed to directly vary the vertical position of the outer end portion of the bale compressing channel 25. As shown in Figure 2, a cross support member 34 passes beneath the inwardly turned flanges 35 and 36 of the side members 23 and 24 and extend laterally beyond each of these side walls of the bale forming chamber 10. An inverted channel 25a is welded as shown at 34a to the cross support member 34. The channel 25a is vertically aligned with the channel 25 and they thus act to compress the bale from opposite sides. A second cross member 37 passes over the top of the bale forming chamber 10 at a position spaced above the inwardly turned flanges 29 and 30. The member 37 is disposed parallel to the bottom cross member 34 and has for one of its functions the guiding of the hydraulic cylinder 33 passing through an aperture in the central portion thereof. The channel 25a is guided by brackets 38 and 39 comparable to the top brackets 27 and 28. The brackets 38 and 39 are fastened to the bottom of the flanges 35 and 36 of the side walls of the chamber 10 by means of bolts or the like 38a. The top cross member 37 is joined to the bottom cross member 34 by means of extension springs 40 and 41. The lower ends of the springs 40 and 41 are attached to the cross member 34 at 42 and 43 and the upper ends of these springs through the medium of rods 44 and 45 are attached to the cross member 37 at 46 and 47, respectively. An upwardly arching member 48 is fastened to the outer ends of the cross member 37 at 46 and 47. The central upwardly arched portion 49 is disposed over the central aperture 50 within the member 37 through which the hydraulic cylinder 33 passes. A piston rod 51 forms a part of the piston disposed within the hydraulic cylinder 33, thus when fluid under pressure is admitted to the cylinder 33 through the inlet 52 the piston rod 51 is extended upwardly against the arch 49 whereby the reactionary force is applied downwardly through the hydraulic cylinder 33 to the upwardly opening bale compressing channel 25 and simultaneously upwardly on the downwardly opening bale compressing channel 25a. Thus as the piston rod 51 is extended the effective bale chamber discharge opening 12 becomes smaller and conversely when the piston rod 51 is drawn into the cylinder 33, thus reducing the overall height of the cylinder and piston rod, there is an enlargement of the effective bale chamber discharge opening 12 making it easier for the formed bale within the chamber to be discharged out the end of the bale forming chamber. The cross members 34 and 37 are normally urged together by the springs 40 and 41 to provide a constantly contracting spring force on the bale chamber discharge opening. It should be understood that the channels 25 and 25a act in opposition to each other to compress the bale material at the position of the discharge opening. As the top channel 25 is moved directly downwardly the bottom channel 25a is pulled up through the medium of the springs 40 and 41. In the adaptation in which the present hydraulic control mechanism is applied there is not a positive raising and lowering of the channels 25 and 25a based merely upon the vertical movement of the piston rod 51. As the springs 40 and 41 become extended and pulling forces increase, and thus as the piston rod 51 is raised, the channels 25 and 25a may not move downwardly and upwardly respectively an amount equal to the extension of the piston rod but rather a portion of that piston rod movement may be compensated for by an extension of the springs 40 and 41. It should, of course, be understood that the device of this invention may be constructed so that the compressing channels 25 and 25a may be positively raised and lowered by hydraulic operation without regard to the internal expanding force of the baled material 13. In such a construction the springs would be removed and the rods 44 and 45 extended to rigidly link the cross members 34 and 37. The details of the hydraulic cylinder 33 and its mounting are shown in greater detail in Figure 3. The piston is designated by numeral 53.

The longitudinally extending bale compressing channels 25 and 25a are fastened at their forward ends by means of spring yielding hinges. As shown in Figure 3, a bolt or the like 54 is arranged and constructed to pass loosely through an aperture in the channel 25 for attachment to a cross frame member 55. The bolt member 54 includes a head 56 engaging the under surface of the frame member 55. A spring 57 surrounds the shank of the bolt 54 and urges the compressing channel member 25 downwardly. Nuts 58 confine the spring 57 on the bolt and vary the compression thereof, depending upon their degree of engagement with the bolt 54. It is thus apparent that the compressing channel 25 may yield slightly in any direction at its forward end independent of the hydraulic means disposed at the rearward end. The bolt 54 thus acts as a universal joint about which the channel may have self-aligning or adjusting movement. It should be understood that other fastening means may be used. The attachment of the forward end of the channel 25a is the same as the channel 25 and is shown generally at 54a in Figure 1.

Intermediate the forward and rearward ends of channel member 25 there is disposed a star wheel 59 having sharp radial points 60 extending along the periphery thereof and adapted to engage hay 61 being compressed within the bale forming chamber 10 and having an engagement effective longitudinally of the bale forming chamber and adjacent and parallel to the compressing channel 25. The star wheel is carried on a shaft 62 extending transversely of the longitudinally extending bale forming chamber 10 and above that bale forming chamber. The shaft 62 is journally mounted within a rectangular frame member 63. A pin 64 is adapted to hold the shaft 62 in a fixed transverse position so that the star wheel 59 engages the hay 61 at the same relative position within the chamber 10. The rectangular frame 63 is hingedly mounted at 65 by means of a cross shaft 66 within a sleeve-like member 67 disposed at the upper end of a supporting structure 68 which is fastened by means of bolts or the like 69 to the top inwardly turned flange 30 of the bale chamber side member 24. It is apparent, therefore, that the rectangular frame member 63 may have substantially vertical movement in an arcuate path about the hinge members 66 and 67. A spring 70 is arranged to bias or urge the frame member 63 downwardly into closer relationship with the top of the bale chamber 10 and thus urge greater penetration of the star wheel 59 within the hay 61. The spring is mounted on a vertical standard 71 and is confined thereon between spaced washers 72 and 73. A nut 74 holds the spring and its end washers 72 and 73 downwardly against a cross plate 75 welded as shown at 76 and 77 to the spaced arms 78 and 79 of the hinged rectangular frame 63. The plate 75 is provided with a circular hole or aperture 80 through which the vertical standard 71 is free to slide. The base of the standard 71 is shown at 81 and is carried on the horizontal portion 82 of the supporting frame 68. A bolt means 83 is shown attaching the base member 81 to the member 82. The spring 70 thus actively urges engagement of the hay 61 by the star wheel 59 and the depth of penetration of the star wheel, and thus concurrently the downward movement of the rectangular frame 63 is dependent upon the density of the hay 61 within the bale forming chamber and the strength of the spring. As shown in Figure 3, the hay 61 is moved through the bale forming chamber 10 in the general rearward direction as indicated by the arrow 84. It is the function of the device of this invention to automatically vary the size of the discharge opening 12 of the bale forming chamber 10 in response to the depth of penetration of this star wheel 59.

Fluid to be used in the hydraulic system of this device is stored in a reservoir 85. This reservoir is fastened by bolt means 86 to the vertical portion 87 of the frame 68. A cap 88 is provided at the top of the reservoir 85 and thus facilitates refilling of hydraulic fluid as necessary. A combination hydraulic pump and valve housing 89 is equipped with a flange 90 around its base portion and by means of bolts 91 is fastened to the horizontal portion 82 of the frame 68. It is thus apparent that the vertical swinging movement of the rectangular frame 63 is with respect to both the vertical standard 71 around which the spring 70 is carried and also the hydraulic pump and valve housing 89. The hydraulic pump within the housing 89 is shown at 92. This pump 92 is of the reciprocating piston type and there is shown projecting therefrom a piston rod 93 which is hingedly attached at 94 to an arcuately swingable arm 95. The arm 95 is hinged at 96 to a frame member 97 hingedly carried on the combination pump and valve housing 89 and 98. A cammed rotor 99 is fastened to the star wheel carrying shaft 62 and is arranged to rotate with the star wheel 59 as that wheel receives rotational drive by reason of movement of the hay 61 through the bale chamber 10. A wheel 100 is journaled for rotation on the arm 95 by means of a stub shaft 101. A ball bearing member 102 is disposed between the shaft 101 and the wheel member 100 so that the wheel 100 may rotate relatively free of frictional interference. The wheel 100 is adapted to ride on the outer periphery of the cam rotor 99. The wheel 100 is arranged to have continual contact with the cam periphery because of a spring 103 arranged to pull the upper end of the arm 95 rearwardly toward the end of the hinged frame 63. The spring is anchored at 104 on the upper end of the arm 95 and at its rearward end at 105 on a hook member 106 which is bolted or otherwise fastened at 107 to an extension lug 108 of the hinged rectangular frame 63. The cam rotor 99 is provided with five radially extending lobes 109 which have intermediately disposed valleys 110. As the star wheel 59 and cam rotor 99 rotate in the direction of the arrow 111, the arm 95 is swung back and forth alternately as the lobes 109 engage the wheel 100 on the arm 95 and then the wheel drops down into the valley 110 by reason of the spring 103 maintaining contact of the wheel 100 with the outer periphery of the cam rotor 99. This back and forth swinging movement of the arm 95 causes the pump piston 93 to reciprocate within the pump 92 causing fluid to be drawn from the reservoir 85 through a conduit 112 and by means of the valve portion 113 of the combination valve and pump 89, the fluid under pressure is thereafter delivered through either a conduit 114 to the cylinder 33 or through a conduit 115 leading back to the reservoir 85. The delivery of fluid under pressure is thus controlled by the valve mechanism 113.

The arm 95 would normally move in an arcuate path back and forth to actuate the piston rod 53 of the pump 92 but in order to compensate for the arcuate movement and to prevent binding of the mechanism, the lower end of the arm 95 is pivoted as previously stated at 96 so that this lower attaching point 96 may move slightly up and down in an arcuate path about the arm 97, so there is an absence of binding within the piston rod 93.

It should be understood that the source of power for this hydraulic pump 92 is obtained by reason of rotation of the density measuring star wheel 59. An upwardly extending handle portion 116 is formed as an integral part of the pivoting arm 95 and thus permits the operator of this machine to manually actuate the pump 92 at certain times such as when the baling machine has been inactive for some period of time and there is an absence of fluid under pressure in the system and/or when it is desired to supplement the fluid under pressure by manually actuating the pump over and above that automatic operation by movement of the hay 61 through the bale forming chamber 10.

As best shown in Figure 6, the valve 113 is of the ball check type and includes a vertical cylindrical passage 117 within the housing 89 and a ball valve 118 which is adapted to have vertical movement within the passage 117. A spring 119 is adapted to urge the ball valve 118 in its lower position in the passage 117 and against the ball seat 121 in the bottom thereof. The pump 92 is adapted to deliver fluid under pressure through the passage 120 into a slightly enlarged chamber 122 beneath the seat 121 in the valve block or housing 89. As shown in Figure 6, the position of the valve 118 is such that all of the fluid put under pressure by the pump 92 will be delivered to the cylinder 33. The enlarged chamber 122 is joined to the cylinder conduit 114 by a cored passage 123. Fluid is blocked from entering the vertical valve passage 117 by reason of the spring urged ball check valve 118. However, this blocking may be removed by pressures in the cylinder 33 exceeding the spring pressure on the ball whereby the ball 118 rises and fluid is permitted to by-pass back to the fluid reservoir through the cored passage 124 to the reservoir conduit 115.

It is the object of this device to effect a change in the forces applied by the ball closing spring 119 by the various vertical positionings of the rectangular frame 63. A cross bracket member 129 spans the sides 78 and 79 of the rectangular frame 63 in much the same manner as the plate 75. Here again the plate bracket 129 is welded at 130 and 131 to the spaced arms 78 and 79 of the frame 63. An adjustable screw member 132 threadedly engages the bracket member 129 and extends downwardly therethrough. A handle 133 is adapted to be engaged by an operator and the screw may be adjusted vertically for varying the point of contact with an upwardly extending slide member 134 from the housing 89. This slide member 134 is best shown in Figure 6 wherein it has vertical sliding movement through a threaded bushing 135 engaging the top opening 117 in the combined pump and valve housing 89. The lower end of the slide member 134 carries a cap like member 134a which fits over the top of the spring 119. When the rectangular frame 63 is in an upper position at a time when the star wheel 59 has difficulty penetrating the hay 61 there will be a minimum of spring force holding the ball 118 in engagement with the seat 121 wherein no fluid will be added to the cylinder 33 but rather the fluid is diverted through the check valve 118 and delivered back to the reservoir. Conversely when the star wheel 59 penetrates the hay 61 to a greater extent, the rectangular frame 63 moves downwardly so that the screw 132 causes the spring 119 to be greatly compressed making it extremely difficult to raise the ball check valve 118 so that a major portion or all of the fluid under pressure from the pump 92 is delivered to the cylinder 33 to thus decrease or contact the size of the discharge opening 12. A pressure gauge 138 is attached to the conduit 114 so that the operator of the device may constantly be aware of the amount of pressure in the line 114 leading to the cylinder 33.

In operation the device of this invention is relatively automatic to the compensating of the size of the discharge opening of a bale forming chamber dependent upon the density of the bales regardless of the condition of the hay being baled. This is accomplished by the hydraulic means described which directly contracts or expands the discharge opening 12 by reason of a fluid under pressure, the source of power for which is the rotation of the hay penetrating wheel. The density of the baled hay directly controls the amount of contraction or expansion of the bale chamber discharge opening. It should be apparent also that the responsiveness of the valve 113 may be made more or less critical by reason of the adjustment of the screw 132 whereby the ball valve 118 may be actuated with greater or lesser fluid pressures dependent upon the position of the rectangular frame 63 on which the penetrating mechanism is all carried.

Numerous details of construction may be varied throughout a wide range without departing from the principles disclosed herein and I, therefore, do not propose limiting the patent granted hereon otherwise than is necessitated by the appended claims.

What is claimed is:

1. An operating mechanism for controlling the size of a bale chamber discharge opening comprising a bale forming chamber through which material to be baled is passed, a means for directly varying the size of the bale chamber discharge opening, a supporting structure mounted on the bale forming chamber, an arm hingedly mounted on said supporting structure, a bale penetrating wheel mounted for rotation on said arm, spring means biasing said arm and penetrating wheel toward engagement with said bale, whereby the bale penetrating wheel is rotated by movement of the bale material within the bale forming chamber and the depth of penetration of said wheel depends upon the density of the bale material, means driven by rotation of said penetrating wheel for actuating said means for directly varying the size of the bale chamber discharge opening, and means dependent upon the degree of penetration of said bale penetrating wheel controlling the degree of actuation of said means for directly varying the size of the bale chamber discharge opening.

2. A device as set forth in claim 1 in which the means for directly varying the size of the bale chamber discharge opening is a hydraulic means.

3. A device as set forth in claim 2 in which the means driven by rotation of said penetrating wheel comprises a lever arm pivotally mounted on said supporting structure, a multiple lobed cam wheel driven by said penetrating wheel, means causing said lever arm to engage and follow said cam wheel whereby the lever arm rocks about its pivotal mounting, a fluid supply, a piston type hydraulic pump, link means joining said rocking lever arm to said hydraulic pump whereby said piston type hydraulic pump is actuated by rotation of the bale penetrating wheel, and conduit means joining said piston type hydraulic pump to said hydraulic means for delivery of fluid under pressure thereto.

4. A device as set forth in claim 3 in which the means dependent upon the degree of penetration includes valve means for controlling the admission or exhausting of fluid under pressure to said hydraulic means.

5. A device as set forth in claim 4 in which said valve means comprises a ball check valve, and spring means urging said valve toward a closed position.

6. A device as set forth in claim 5 in which there is included means interconnecting said spring means and said hingedly mounted arm for varying the compression of said spring means of said bottle check valve by varying the position of said hinged arm.

7. A device as set forth in claim 6 in which said means interconnecting said spring means and said hingedly mounted arm includes an adjustable screw means on said hingedly mounted arm and a spaced apart aligned slidable rod member on said spring means whereby upon adjustment of said adjustable screw means greater or less engagement of said slidable rod member may be had by said hingedly mounted arm.

8. A device as set forth in claim 3 in which said lever arm has a hand engaging portion to provide for manual operation of said hydraulic pump.

9. A device as set forth in claim 1 in which the means driven by rotation of said penetrating wheel comprises a lever arm pivotally mounted on said supporting structure, a cam wheel driven by said penetrating wheel, means causing said lever arm to engage and follow said cam wheel whereby the lever arm rocks about its pivotal mounting supplying a driving force for actuating said means for directly varying the size of the bale chamber discharge opening.

10. An operating mechanism for controlling the transverse size of a bale chamber comprising a bale forming chamber through which material to be baled is passed, a means for directly varying the size of the bale chamber, a supporting structure mounted on the bale forming chamber, an arm hingedly mounted on said supporting structure, a bale penetrating wheel mounted for rotation on said arm, spring means biasing said arm and penetrating wheel toward engagement with said bale, whereby the bale penetrating wheel is rotated by movement of the bale material within the bale forming chamber and the depth of penetration of said wheel depends upon the density of the bale material, means driven by said penetrating wheel for actuating said means for directly varying the size of the bale chamber, and means dependent upon the degree of penetration of said bale penetrating wheel controlling the degree of actuation of said means for directly varying the size of the bale chamber.

11. An operating mechanism for controlling the cross sectional size of a bale chamber comprising a bale forming chamber through which material to be baled is passed, a means for directly varying the size of the bale chamber, a supporting structure mounted on the bale forming chamber, an arm hingedly mounted on said supporting structure, a bale engaging member mounted on said arm, spring means biasing said arm and bale engaging member toward engagement with said bale, means compressing material to be baled within said bale forming chamber, and means for actuating said means for directly varying the size of the bale chamber and said last named means rotatably driven in response to movement of the material to be baled through said bale forming chamber.

References Cited in the file of this patent

UNITED STATES PATENTS

| | | |
|---|---|---|
| 2,478,012 | Raney | Aug. 2, 1949 |
| 2,576,784 | Dodds et al. | Nov. 27, 1951 |
| 2,613,590 | Graybill | Oct. 14, 1952 |